United States Patent
Kozawa et al.

(10) Patent No.: US 10,300,944 B2
(45) Date of Patent: *May 28, 2019

(54) SENSOR DEVICE AND ELECTRIC POWER STEERING APPARATUS USING SAME

(71) Applicant: DENSO CORPORATION, Kariya, Aichi-pref. (JP)

(72) Inventors: Takaharu Kozawa, Kariya (JP); Shuji Kuramitsu, Kariya (JP); Koichi Nakamura, Kariya (JP); Katsuhiko Hayashi, Kariya (JP); Masaya Taki, Kariya (JP); Toshimitsu Sakai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 256 days.

This patent is subject to a terminal disclaimer.

(21) Appl. No.: 15/158,283

(22) Filed: May 18, 2016

(65) Prior Publication Data

US 2016/0339945 A1 Nov. 24, 2016

(30) Foreign Application Priority Data

May 20, 2015 (JP) .................................. 2015-102773

(51) Int. Cl.
*B62D 5/04* (2006.01)
*G01L 25/00* (2006.01)
*G01L 3/10* (2006.01)

(52) U.S. Cl.
CPC ........... *B62D 5/049* (2013.01); *B62D 5/0463* (2013.01); *G01L 3/104* (2013.01); *G01L 25/003* (2013.01)

(58) Field of Classification Search
CPC ....... B62D 5/049; B62D 5/0463; G01L 3/104; G01L 25/003
See application file for complete search history.

(56) References Cited

U.S. PATENT DOCUMENTS 7,717,085 B1 * 5/2010 Bauerle ................. F02D 11/106
123/399
2015/0066301 A1 3/2015 Kozawa

OTHER PUBLICATIONS

Yoo, Kwangho, et al. "Study on development of torque and angle sensor for EPS." SAE International Journal of Passenger Cars-Electronic and Electrical Systems 5.2012-01-0941 (2012): 292-296. (Year: 2012).*
Infineon, TLE4998S8D Grade 1 High Perfomance Programmable Dual Linerar Hall Sensor Technical Product Description (Year: 2014).*

(Continued)

*Primary Examiner* — Alan D Hutchinson
(74) *Attorney, Agent, or Firm* — Knobbe, Martens, Olson & Bear, LLP

(57) ABSTRACT

A sensor device including a first output circuit generating and outputting a first output signal that is generated as a signal sequence from a first main signal based on a detection value of a first main sensor element to a first sub signal based on a detection value of a first sub sensor element, a second output circuit generating and outputting a second output signal that is generated as a signal sequence from a second main signal based on a detection value of a second main sensor element to a second sub signal based on a detection value of a second sub sensor element, and an abnormality determiner determining abnormality of the device based on the first output signal and the second output signal.

12 Claims, 11 Drawing Sheets

(56) References Cited

OTHER PUBLICATIONS

SAE, J2716, Surface Vehicle Information Report, SENT Single Edge Nibble Transmission for Automotive Applications, 2005 (Year: 2005).*

U.S. Appl. No. 15/158,189, filed May 18, 2016, Kuramitsu, et al., JP 2015-102772.

U.S. Appl. No. 15/086,643, filed Mar. 31, 2016, Kozawa, et al., JP 2015-76873 JP 2016-029839.

* cited by examiner

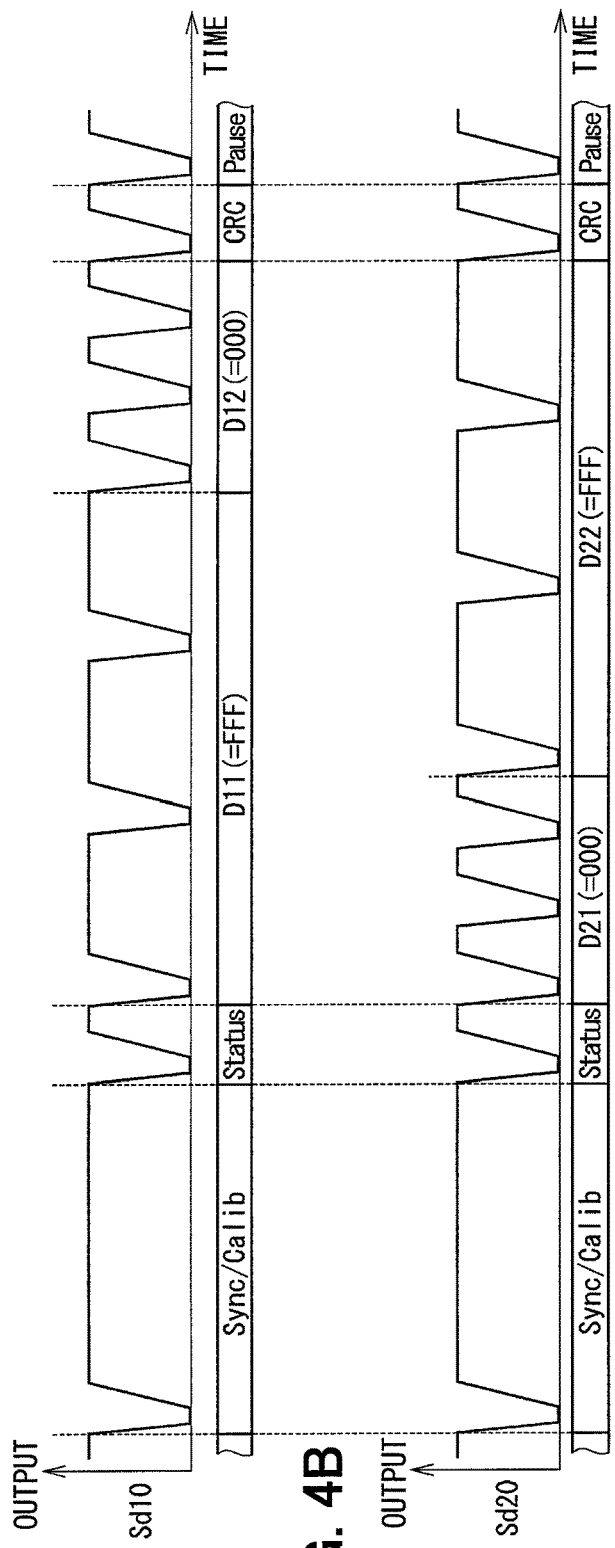

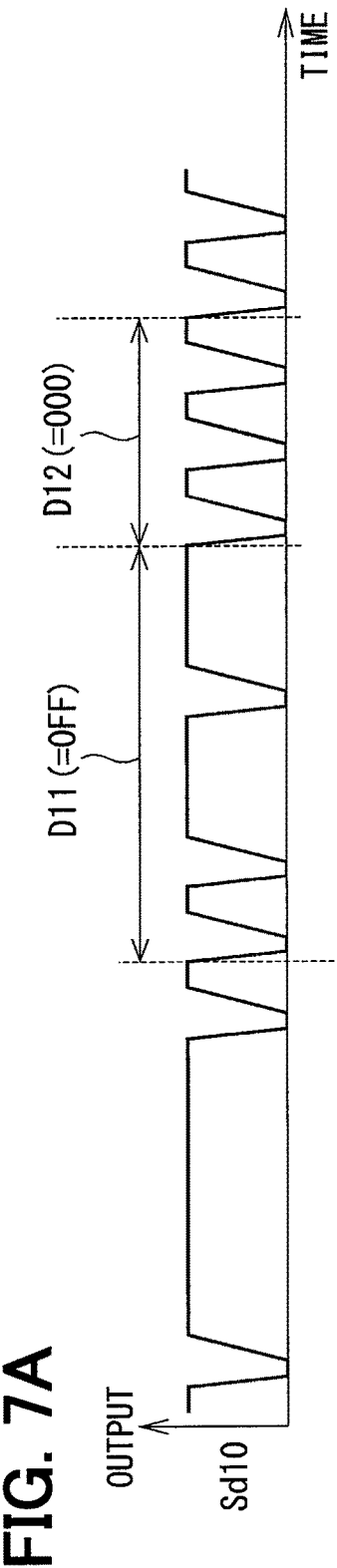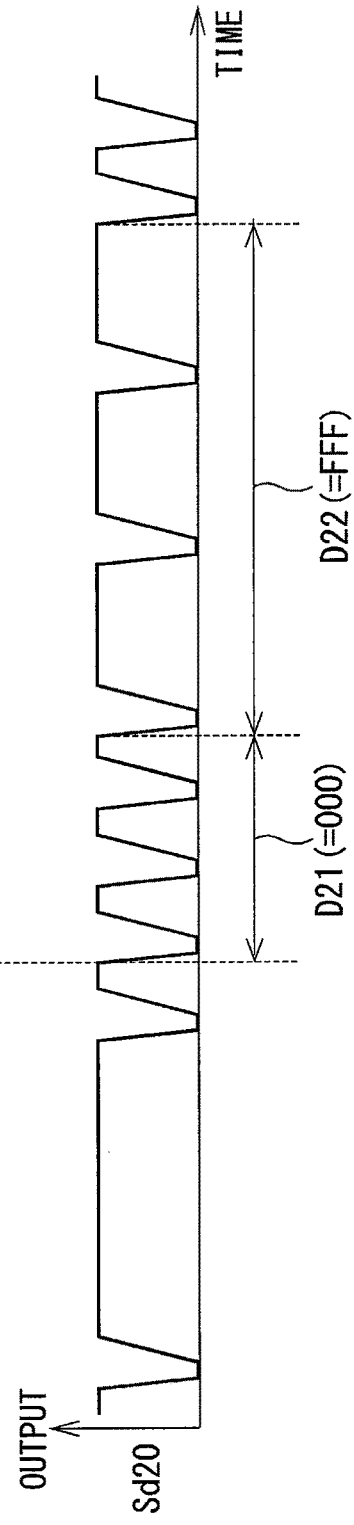

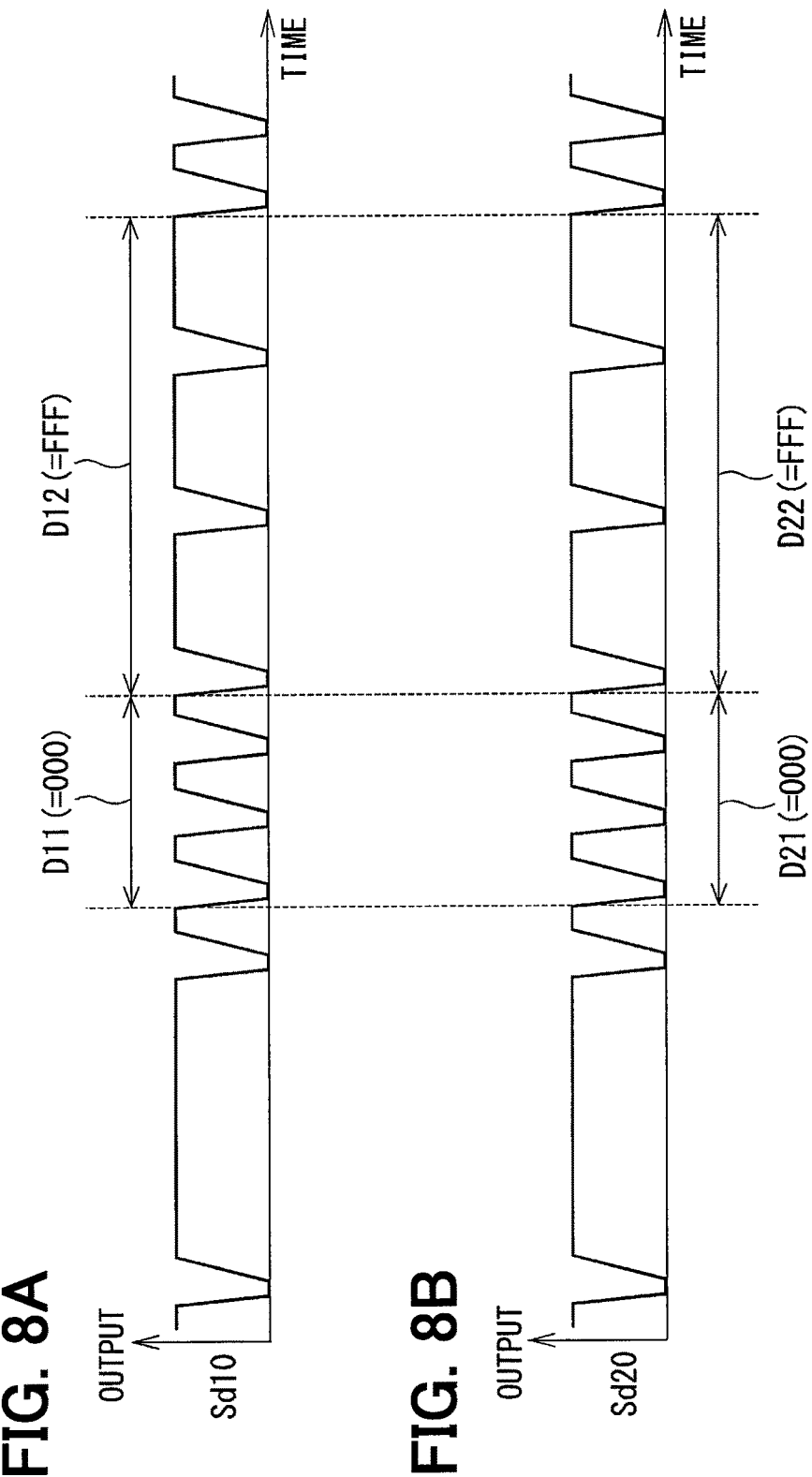

|  | V11 | V12 | V21 | V22 |
|---|---|---|---|---|
| V11 | — | (1) V51 NG | (3) V53 NG | (5) V55 NG |
| V12 | — | — | (6) V56 OK | (4) V54 OK |
| V21 | — | — | — | (2) V52 OK |
| V22 | — | — | — | — |

SENSOR DEVICE AND ELECTRIC POWER STEERING APPARATUS USING SAME

CROSS REFERENCE TO RELATED APPLICATION

The present application is based on and claims the benefit of priority of Japanese Patent Application No. 2015-102773, filed on May 20, 2015, the disclosure of which is incorporated herein by reference.

TECHNICAL FIELD

The present disclosure generally relates to a sensor device and an electric power steering apparatus used the sensor device.

BACKGROUND INFORMATION

Generally, an electronic control system transmits data to a control unit from various sensors (e.g., a torque sensor or the like). In a patent document, JP 2015-46770 A (Patent document 1), the system determines abnormality of a torque sensor by using normal data and monitoring data.

In the patent document 1, two torque sensors are provided, and one of the two sensors monitors the other. However, in the patent document 1, the disclosure is silent about a determination of which one of the sensor elements has abnormality, or a short-circuit abnormality of a communication line.

SUMMARY

It is an object of the present disclosure to provide a sensor device, and an electric power steering apparatus using the sensor device, which is capable of appropriately determining abnormality caused in the sensor device.

The sensor device of the present disclosure is provided with a first sensor part, a second sensor part, and a controller.

The first sensor part has a first main sensor element, a first sub sensor element, and a first output circuit. The first main sensor element and the first sub sensor element detect a physical quantity of a detection object. The first output circuit generates and transmits a first output signal that includes a first main signal based on a detection value of the first main sensor element and a first sub signal based on a detection value of the first sub sensor element arranged in this order in the first output signal.

The second sensor part has a second main sensor element, a second sub sensor element, and a second output circuit. The second main sensor element and the second sub sensor element detect the physical quantity of the detection object. The second output circuit generates and transmits a second output signal that includes a second main signal based on a detection value of the second main sensor element and a second sub signal based on a detection value of the second sub sensor element arranged in this ordered sequence of signals in the second output signal.

The controller has a signal obtainer and an abnormality determiner. The signal obtainer obtains the first output signal and the second output signal. The abnormality determiner performs an abnormality determination based on the first output signal and the second output signal.

One of (i) the first main signal and the second sub signal and (ii) the first sub signal and the second main signal are direct signals that increase with an increase of the detection value, and the other one of (i) and (ii) are that signals that decrease with the increase of the detection value.

In the present disclosure, the first main signal and the first sub signal are included in the first output signal, and the second main signal and the second sub signal are included in the second output signal. Therefore, the controller is enabled to use signals corresponding to each of the detection values from the four sensors. Thus, by using the four signals, an abnormal sensor having abnormality is appropriately identifiable.

Further, the first sub signal and the second main signal are reverse signals of the first main signal and the second sub signal, respectively. Therefore, even when the detection values are the same, the first output signal and the second output signal are not generated as the same signal. Therefore, it is determinable regarding whether the two output signals are generated and transmitted based on the same detection value, and it is determinable whether a communication line is short-circuited.

BRIEF DESCRIPTION OF THE DRAWINGS

Objects, features, and advantages of the present disclosure will become more apparent from the following detailed description made with reference to the accompanying drawings, in which:

FIG. 4A is a time chart of a first output in the first embodiment of the present disclosure;

FIG. 4B is a time chart of a second output signal in the first embodiment of the present disclosure;

FIG. 7A is a time chart of the first output signal at a data abnormal time in the first embodiment of the present disclosure;

FIG. 7B is a time chart of the second output signal at a data abnormal time in the first embodiment of the present disclosure;

FIG. 8A is a time chart of the first output signal at a communication line short-circuit abnormality time in the first embodiment of the present disclosure;

FIG. 8B is a time chart of the second output signal at a communication line short-circuit abnormality time in the first embodiment of the present disclosure;

DETAILED DESCRIPTION

Hereafter, a sensor device regarding the present disclosure is described based on the drawings.

Hereafter, same numerals are assigned to same components in the following embodiments, and descriptions of the same components are not repeated.

First Embodiment

The first embodiment of the present disclosure is described based on FIGS. 1-10A/B.

Figure 1:
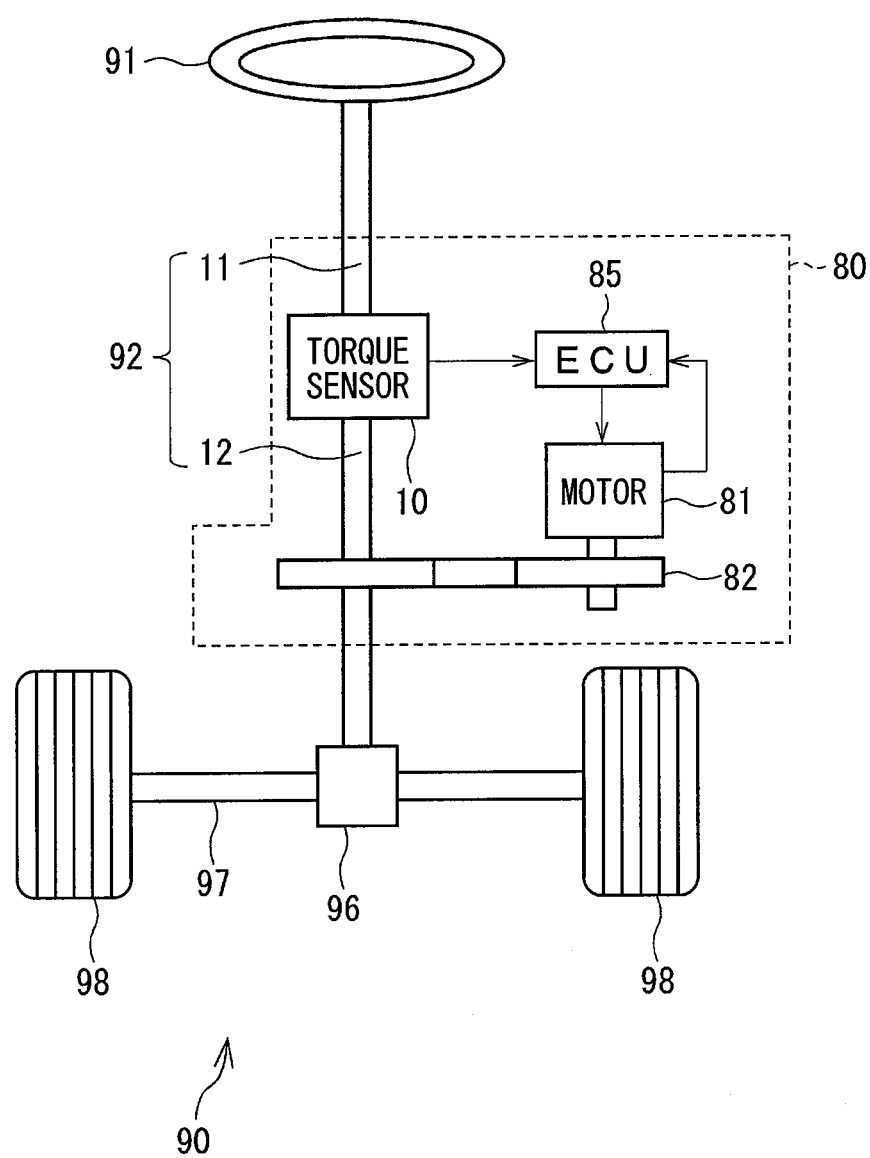
FIG. 1 is a block diagram of an electric power steering apparatus in a first embodiment of the present disclosure.
Figure 2:
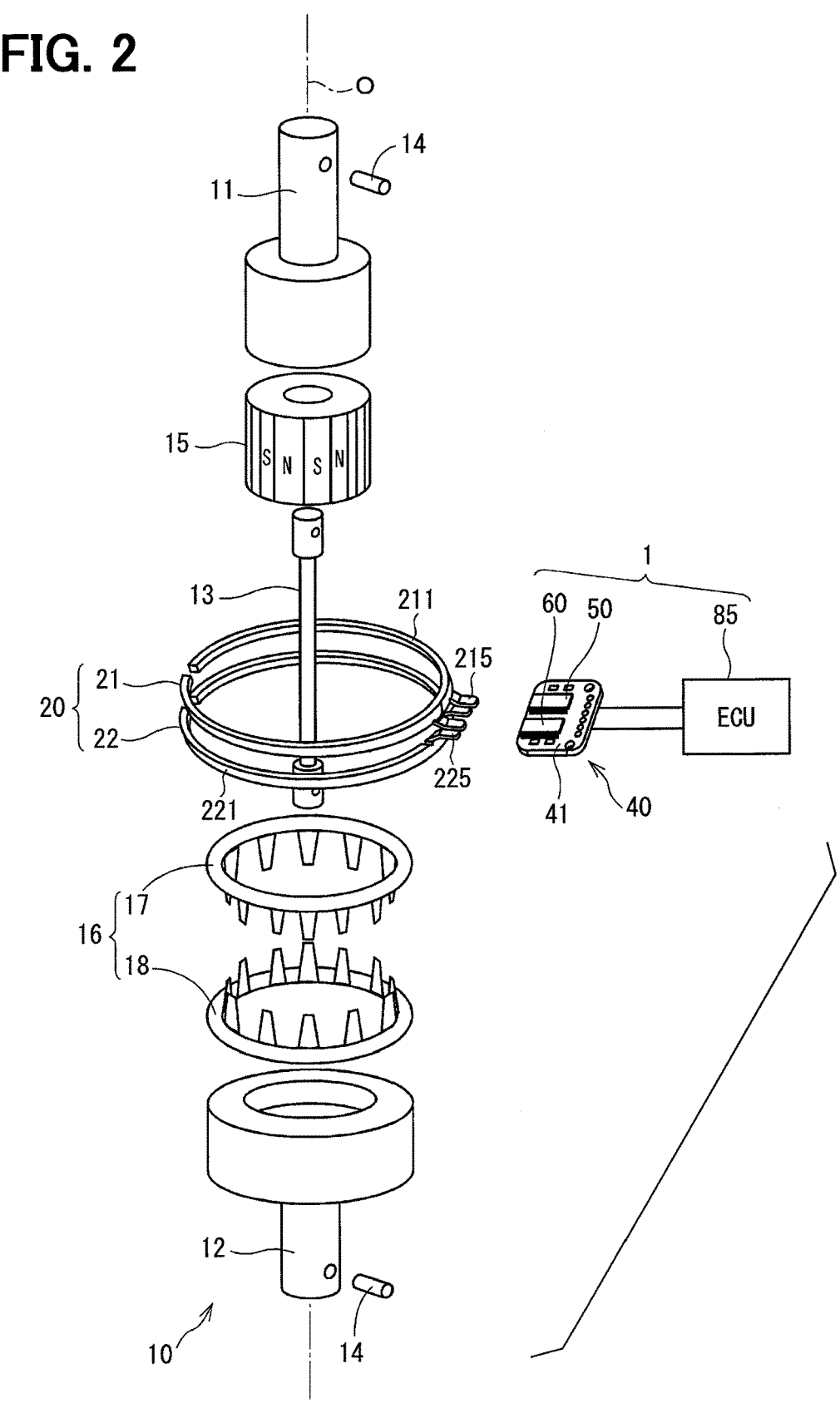
FIG. 2 is an exploded perspective view of a torque sensor in the first embodiment of the present disclosure.

As shown in FIGS. 1 and 2, a sensor device 1 is applied to an electric power steering apparatus 80, in which an Electronic Control Unit (ECU) 85 serving as a controller is provided together with a first magnetic sensor 50, a second magnetic sensor 60, and the like, for assisting a steering operation of a vehicle.

The entire configuration of a steering system 90 having the electric power steering apparatus 80 is shown in FIG. 1.

A steering wheel 91 as a steering component is connected with a steering shaft 92.

The steering shaft 92 has an input shaft 11 as a first shaft and an output shaft 12 as a second shaft. The input shaft 11 is connected with the steering wheel 91. At a position between the input shaft 11 and the output shaft 12, a torque sensor 10 detecting a torque applied to the steering shaft 92 is disposed. A pinion gear 96 is disposed on one end of the output shaft 12 opposite to the input shaft 11. The pinion gear 96 engages with a rack shaft 97. A pair of wheels 98 are connected with both ends of the rack shaft 97 via a tie rod etc.

When a driver rotates the steering wheel 91, the steering shaft 92 connected with the steering wheel 91 rotates. The rotational movement of the steering shaft 92 is turned into a translational motion of the rack shaft 97 by the pinion gear 96, and the pair of wheels 98 are steered by an angle according to an amount of displacement of the rack shaft 97.

The electric power steering apparatus 80 is provided with a motor 81 that outputs an assist torque for assisting a steering operation of the steering wheel 91 by the driver, a speed reduction gear 82 serving as a power transmission part, the torque sensor 10, ECU 85 and the like. Although the motor 81 and ECU 85 have separate bodies in FIG. 1, they may be combined to have one body.

The speed reduction gear 82 slows down a rotation speed of the motor 81, and transmits the rotation to the steering shaft 92. That is, although the electric power steering apparatus 80 of the present embodiment is what is called a "column assist type", the apparatus 80 may also be a "rack assist type" that transfers rotation of the motor 81 to the rack shaft 97. In other words, although the steering shaft 92 is a "drive object" in the present embodiment, the rack shaft 97 may also be a "drive object." The details of ECU 85 are mentioned later.

As shown in FIG. 2, the torque sensor 10 is provided with the input shaft 11, the output shaft 12, a torsion bar 13, a multipolar magnet 15, a magnetic yoke 16, a magnetic flux collection module 20, a sensor unit 40 and the like.

The torsion bar 13 has one end connected with the input shaft 11 and the other end connected with the output shaft 12 by a pin 14, respectively, and connects the input shaft 11 and the output shaft 12 on the same axis (i.e., coaxially connects the shaft 11 and the shaft 12 on a rotation axis O). The torsion bar 13 is an elastic member in a rod shape, and converts a torque applied to the steering shaft 92 into a twist displacement.

The multipolar magnet 15 is formed in a cylinder shape, and is fixed to the input shaft 11. On the multipolar magnet 15, an N pole and an S pole are magnetized by turns along a periphery. Although the number of poles may be arbitrarily determined, the number of N poles and S poles is configured to be 12 pairs, having a total of 24 poles.

The magnetic yoke 16 is held by a yoke attachment component which is formed by nonmagnetic materials (e.g., the resin) (not illustrated), and forms a magnetic circuit in a magnetic field that is generated by the multipolar magnet 15.

The magnetic yoke 16 includes a first yoke 17 and a second yoke 18, and the first yoke 17 is disposed on one side of the yoke 16 close to the input shaft 11, and the second yoke 18 is disposed on the other side of the yoke 16 close to the output shaft 12. Both of the first yoke 17 and the second yoke 18 have an annular shape, and are made with a soft magnetic material, and are fixedly attached to the output shaft 12 on a radius outside of the multipolar magnet 15.

The magnetic flux collection module 20 includes magnetic flux collection rings 21 and 22. The magnetic flux collection rings 21 and 22 are arranged on a radius outside of the magnetic yoke 16, and collect the magnetic flux from the magnetic yoke 16. A first magnetic flux collection ring 21 is disposed on one side of the module 20 close to the input shaft 11, and a second magnetic flux collection ring 22 is disposed on the other side of the module 20 close to the output shaft 12. The first magnetic flux collection ring 21 and the second magnetic flux collection ring 22 are held by a non-illustrated magnetic flux collection ring holder member that is formed by an insert molding etc.

The first magnetic flux collection ring 21 comprises (i) a ring part 211 that is made with the soft magnetic material substantially in a ring shape and (ii) two magnetic flux collecting parts 215 projecting toward a radius outside from the ring part 211. The number of the magnetic flux collecting parts 215 may be configured to match the number of sensor parts 55, 65 mentioned in the following.

The second magnetic flux collection ring 22 comprises (i) a ring part 221 that is made with the soft magnetic material substantially in a ring shape, just like the first magnetic flux collection ring 21, and two magnetic flux collecting parts 225 projecting toward a radius outside from the ring part 221.

In the present embodiment, the first magnetic flux collection ring 21 and the second magnetic flux collection ring 22 substantially have the same form.

The magnetic flux collecting part 215 of the first magnetic flux collection ring 21 and the magnetic flux collecting part 225 of the second magnetic flux collection ring 22 are disposed to face each other, and have respective facing surfaces arranged substantially in parallel.

The magnetic sensors 50 and 60 are arranged at a position between the magnetic flux collecting parts 215 and 225.

The sensor unit 40 includes a substrate 41 and the magnetic sensors 50 and 60.

The substrate 41 is formed in a plate-like, approximately rectangular shape, and the magnetic sensors 50 and 60 are mounted thereon. The magnetic sensors 50 and 60 are mounted on the same surface of the substrate 41.

The magnetic sensors 50 and 60 detect a magnetic flux density according to an amount of twist displacement and a twist displacement direction of the torsion bar 13, and outputs output signals Sd10 and Sd20 to ECU 85 by digital communications.

The first magnetic sensor 50 and the second magnetic sensor 60 have substantially the same configuration, and are mounted on the substrate 41 at side-by-side positions, facing in the same direction.

The first magnetic sensor 50 outputs the first output signal Sd10 to ECU 85 at a constant interval, and the second magnetic sensor 60 outputs the second output signal Sd20 to ECU 85 at a constant interval.

Figure 3:
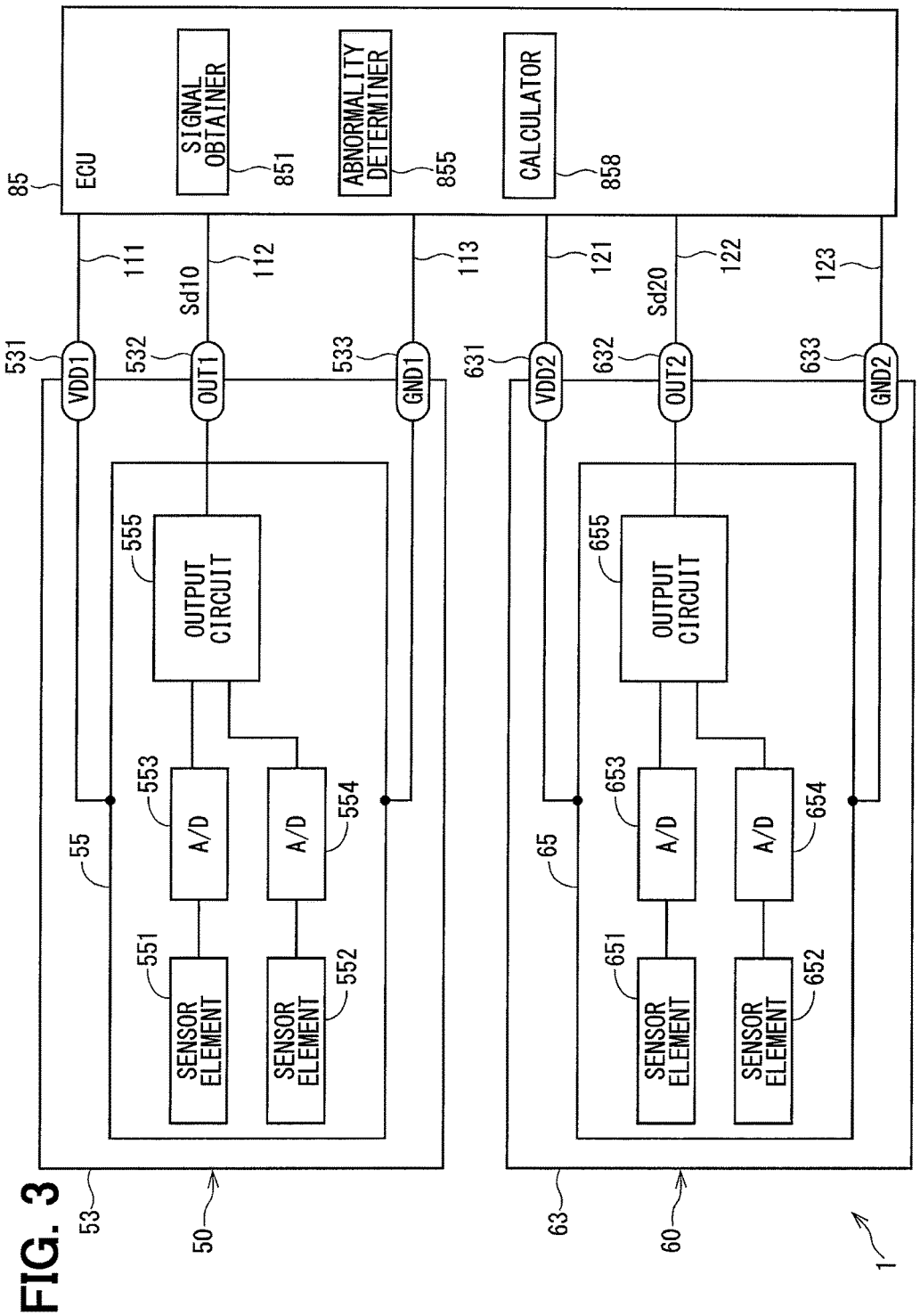
FIG. 3 is a block diagram of the sensor device in the first embodiment of the present disclosure.

As shown in FIG. 3, the first magnetic sensor 50 has a sealed part 53 and a first sensor part 55, and the second magnetic sensor 60 has a sealed part 63 and a second sensor part 65.

The configuration concerning the first magnetic sensor 50 is hereafter designated as 50-something numbers or 500-something numbers, and the configuration concerning the second magnetic sensor 60 is hereafter designated as 60-something numbers or 600-something numbers, suggesting that the same last one digit or two digits indicate the same component/configuration. Hereafter, the description is focused on the first magnetic sensor 50, and the same configuration of the sensor 60 may be not repeated whenever appropriate.

The sealed part 53 seals the first sensor part 55 implemented as a semiconductor chip or the like, substantially in a flat and rectangular shape. The sealed part 53 has a power supply terminal 531, a communication terminal 532, and a ground terminal 533 disposed on the sealed part 53 and projecting from the sealed part 53.

The power supply terminal 531 of the first magnetic sensor 50 is connected to ECU 85 by a first power source line 111, and the communication terminal 532 of the first magnetic sensor 50 is connected to ECU 85 by a first communication line 112, and the ground terminal 533 of the first magnetic sensor 50 is connected to ECU 85 by a first ground line 113.

Further, in the second magnetic sensor 60, a power supply terminal 631 is connected to ECU 85 by a second power source line 121, and a communication terminal 632 is connected to ECU 85 by a second communication line 122, and a ground terminal 633 is connected to ECU 85 by a second ground line 123.

The voltage adjusted to a predetermined voltage value (e.g., 5[V]) is supplied to the power supply terminals 531 and 631 from a regulator of ECU 85 which is not illustrated. The ground terminals 533 and 633 are connected with the ground via ECU 85.

The communication terminal 532 and the first communication line 112 are used for communications between the first magnetic sensor 50 and ECU 85. According to the present embodiment, the first output signal Sd10 is transmitted to ECU 85 from the first magnetic sensor 50 via the communication terminal 532 and the first communication line 112.

Further, the communication terminal 632 and the second communication line 122 are used for communications between the second magnetic sensor 60 and ECU 85. According to the present embodiment, the second output signal Sd20 is transmitted to ECU 85 from the second magnetic sensor 60 via the communication terminal 632 and the second communication line 122.

The first sensor part 55 includes a first main sensor element 551, a first sub sensor element 552, Analog/Digital (A/D)-conversion circuits 553 and 554, a first output circuit 555, and the like.

The sensor elements 551 and 552 are respectively a magnetic flux detecting element that detects the magnetic flux between the magnetic flux collecting parts 215 and 225. The sensor elements 551 and 552 in the present embodiment are respectively implemented as a Hall element. In the present embodiment, for a distinction of signal orders (i.e., a sequence of signals), in the first output signal Sd10, the sensor elements 551 and 552 are designated as "main" and "sub" elements, the first main sensor element 551 and the first sub sensor element 552 are substantially the same element.

The A/D-conversion circuit 553 performs an A/D conversion of a detection value detected by the sensor element 551. The A/D-conversion circuit 554 performs an A/D conversion of a detection value detected by the sensor element 552.

The first output circuit 555 generates the first output signal Sd10 based on the detection value which has been detected by the sensor elements 551 and 552 and A/D converted.

The first output signal Sd10 generated thereby is transmitted to ECU 85 via the communication terminal 532 by a Single Edge Nibble Transmission (SENT) communication method, which is one type of digital communications.

The second output circuit 655 generates the second output signal Sd20 based on the detection value that has been detected by the sensor elements 651 and 652, and A/D converted.

The second output signal Sd20 generated by the second output circuit 655 is transmitted to ECU 85 by the SENT communication method via the communication terminal 632.

The details of the output signals Sd10 and Sd20 are mentioned later.

ECU 85 is constituted by a microcontroller etc., and has a signal obtainer 851, an abnormality determiner 855, a calculator 858 and the like as functional blocks.

The signal obtainer 851 obtains the output signals Sd10 and Sd20 that are transmitted from the magnetic sensors 50 and 60.

The abnormality determiner 855 determines abnormality of the sensor elements 551, 552, 651, and 652, and other abnormality such as a short circuit abnormality of the communication lines 112 and 122, and the like.

The details of the abnormality determination are mentioned later.

The calculator 858 performs various calculations by using a data value that corresponds to the detection value of the sensor element that has no abnormality caused therein. According to the present embodiment, the calculator 858 calculates a steering torque based on the data value. The calculated steering torque is then used for a drive control of the motor 81. More practically, the calculator 858 calculates a torque instruction value based on the steering torque. ECU 85 controls a drive of the motor 81 by a conventional method (e.g., by a feedback control), based on the torque instruction value.

Each of the processes performed in ECU 85 may be a software process by executing a program memorized in advance by CPU, or may be a hardware process performed by a dedicated electronic circuit.

The details of the output signals Sd10 and Sd20 are described based on FIG. 4.

FIG. 4A shows the first output signal Sd10, and FIG. 4B shows the second output signal Sd20. Further, FIGS. 7A/B and 8A/B also show the first/second output signals Sd10, Sd20 in the same manner.

The number of bits in each of those signals is suitably set up according to the telecommunications standard etc. According to the SENT communication method, a data of the signals Sd10, Sd20 is represented as a pulse, which defined by a time width between a rising edge of the pulse and a falling edge of the pulse.

The first output signal Sd10 consists of a synchronization signal (i.e., "Sync/Calib" in FIGS. 4A/B), a status signal, a first main signal D11, a first sub signal D12, a Cyclic Redundancy (CRC) signal as a communication error detection signal, and a pause signal, and these signals in the first output signal Sd10 are outputted in this order (i.e., as an ordered sequence of signals).

The synchronization signal is a signal for synchronizing between the first sensor part 55 and the clock of ECU 85, and is set to 56 ticks in the present embodiment. According to the present embodiment, a correction coefficient is calculated based on the length of the synchronization signal, and each signal is corrected by using the correction coefficient concerned.

The status signal includes (i) a slow data which is made up from signals in plural cycles and (ii) information of an update counter. The update counter is incremented by +1 (i.e., a counter value increased by one) for every transmission of the output signal Sd10. For example, in case that the update counter is represented by 2 bits, the counter value is updated as 0→1→2→3→0→1 - - - . Here, when the update counter increases to the maximum value (i.e., "3" in this case), the counter returns to the minimum value (i.e., "0") by an increment of +1.

By transmitting the information about the update counter, ECU 85 can determine whether the same data is transmitted due to the same detection value as a previous signal, or due to a data adherence abnormality.

The CRC signal is a signal for detecting a communication error, and has a signal length computed based on the main signal D11 and the sub signal D12.

The pause signal is a signal that is outputted in a cycle period (i.e., before an output of the synchronization signal of the next cycle).

The second output signal Sd20 consists of the synchronization signal, the status signal, a second main signal D21, a second sub signal D22, the CRC signal, and the pause signal, and the second output signal Sd20 is outputted as a series of signals in this order, as an ordered sequence of signals.

Since each of the signals except the second main signal D21 and the second sub signal D22 is the same as that of the first output signal Sd10, description regarding the same signals is omitted.

The main signal D11 of the first output signal Sd10 is a data signal based on the detection value of the first main sensor element 551, and the sub signal D12 of the first output signal Sd10 is a data signal based on the detection value of the first sub sensor element 552.

The main signal D21 of the second output signal Sd20 is a data signal based on the detection value of the second main sensor element 651, and the sub signal D22 is a data signal based on the detection value of the second sub sensor element 652.

All of the signals D11, D12, D21, and D22 are signals according to (i.e., representing), the magnetic flux density at a position between the magnetic flux collecting parts 215 and 225, and are generated based on the detection value at the time of signal generation. Further, the update cycle of the detection values may be configured to be shorter than the cycle of those signals D11, D12, D21, and D22, and the signals D11, D12, D21, and D22 may be generated based on the latest one of the detection values.

Both of the first main signal D11 and the first sub signal D12 are 3 nibbles (=12 bits), and are a total of 6 nibbles as a data part. The data contents are represented at least by 1 nibble, which is defined according to the communication specification.

In the present embodiment, an internal process of the first sensor part 55 does not involve an aggregation process of making up one aggregated data by an addition/subtraction/multiplication/division etc. of many detection values from the sensor elements 551 and 552 or a selection process of selecting one of many detection values. That is, the detection values from the sensor elements 551, 552 are used "as is" to generate the first main signal D11 and the first sub signal D12 for the utilization of the detection values in ECU 85.

The same applies to the second main signal D21 and the second sub signal D22.

Now, assuming that a value represented by the first main signal D11 is a first main data value V11, and a value represented by the first sub signal D12 is a first sub data value V12, and a value represented by the second main signal D21 is a second main data value V21, and a value represented by the second sub signal D22 is a second sub data value V22.

Each of the data values V11, V12, V21, and V22 is an after-correction value corrected by the correction coefficient that is computed based on the synchronization signal.

As shown in FIGS. 4A/B and 5A/B, the first main data value V11 and the first sub data value V12 are values reversed (i.e., inverted) from each other at a certain center value. Also, the second main data value V21 and the second sub data value V22 are values reversed from each other at a certain center value. According to the present embodiment, the certain center values are defined as 50% of an output code. However, the certain center value may arbitrarily be modified from 50% position.

Figure 5A:
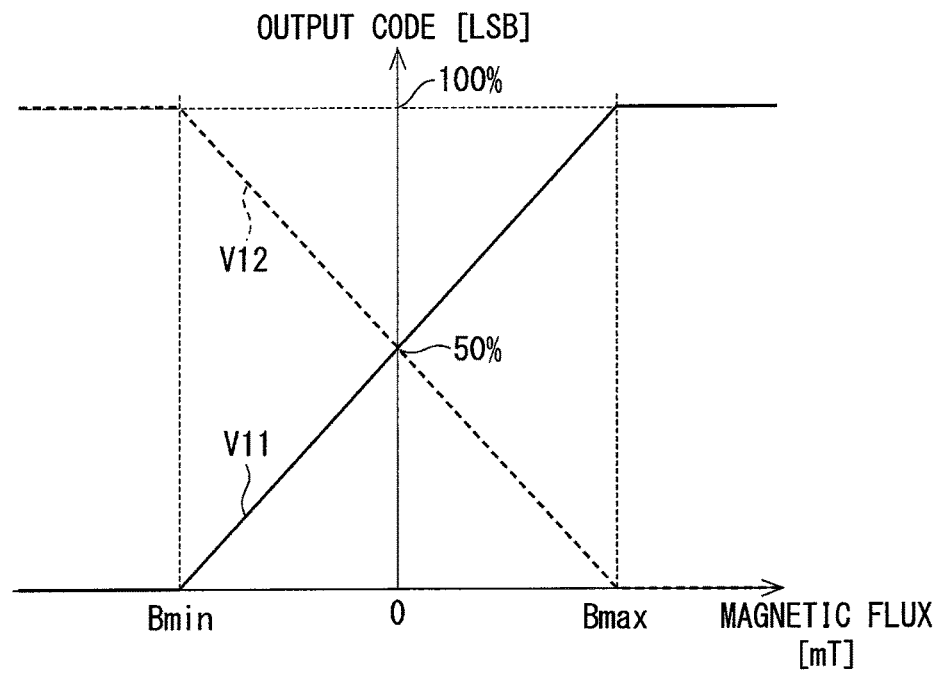
FIG. 5A is a diagram of a first main data value and a first sub data value in the first embodiment of the present disclosure.

More practically, as shown in FIG. 5A in a solid line, the first main data value V11 takes a lower limit value when the magnetic flux density is equal to or less than Bmin, and takes an upper limit value when the magnetic flux density is equal to or greater than Bmax, and the data value V11 increases from the lower limit value to the upper limit value with an increase of the magnetic flux density between Bmin and Bmax.

The first sub data value V12 in a dash line in the same drawing takes the upper limit value when the magnetic flux density is equal to or less than Bmin, and takes the lower limit value when the magnetic flux density is equal to or greater than Bmax, and the data value V12 decreases from the upper limit value to the lower limit value with an increase of the magnetic flux density between Bmin and Bmax.

Figure 5B:
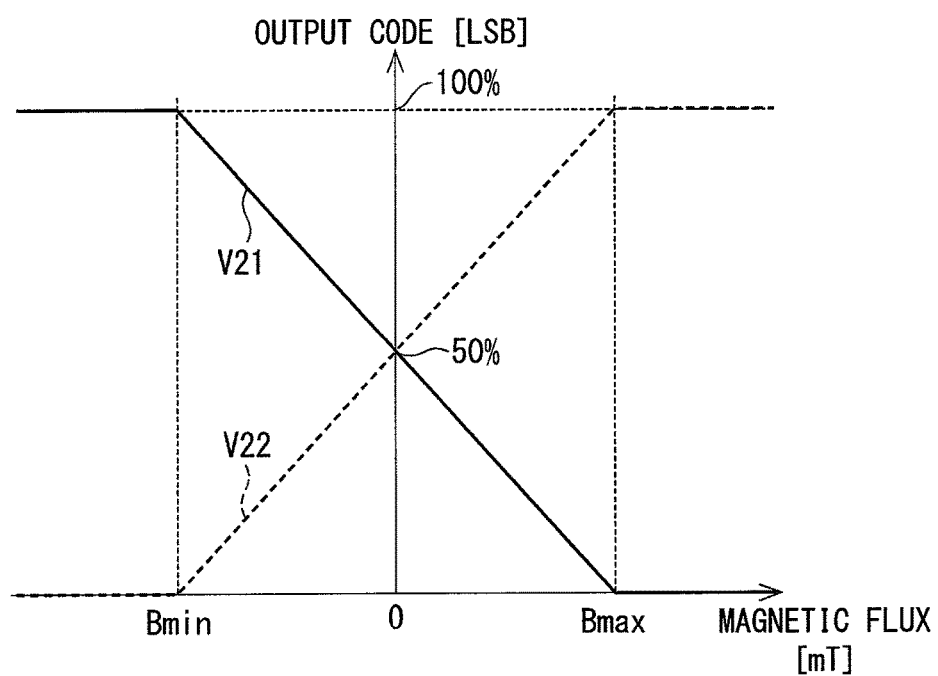
FIG. 5B is a diagram of a second main data value and a second sub data value in the first embodiment of the present disclosure.

Further, as shown in FIG. 5B in a solid line, the second main data value V21 takes an upper limit value, when the magnetic flux density is equal to or less than Bmin, and takes a lower limit value when the magnetic flux density is equal to or greater than Bmax, and the data value V21 decreases from the upper limit value to the lower limit value with an increase of the magnetic flux density between Bmin and Bmax.

The first sub data value V22 in a dash line in the same drawing takes the lower limit value when the magnetic flux density is equal to or less than Bmin, and takes the upper limit value when the magnetic flux density is equal to or greater than Bmax, and the data value V22 increases from the lower limit value to the upper limit value with an increase of the magnetic flux density between Bmin and Bmax.

As shown in FIGS. 5A/B, theoretically, the first main data value V11 and the second sub data value V22 have the same absolute value of inclination with an inverted/reversed sign (+/−) of inclination, and the first sub data value V12 and the second main data value V21 have the same absolute value of inclination with an inverted/reversed sign (+/−) of inclination.

Figure 6:
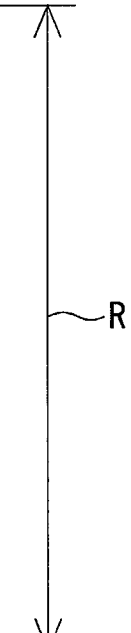
FIG. 6 is another diagram of the first main data value, the first sub data value, the second main data value, and the second sub data value in the first embodiment of the present disclosure.

As shown in FIG. 6, when 12 bits are, as a full range, configured to represent the data signal in the first output signal Sd10, the lower limit of the data values V11 and V12 is set to "000", and the upper limit thereof is set to "FFF."

When 12 bits are not used as the full range, the lower limit value may be set as a value greater than 0% output code (e.g., "002") or the like, and the upper limit value may be set as a value smaller than 100% output code (e.g., "FFD") or the like. The same applies to the data values V21, V22.

According to the present embodiment, the first main data value V11 and the first sub data value V12 are reversed (i.e., inverted) from each other. Therefore, when the first main data value V11 and the first sub data value V12 are normal, a summation of the data values V11 and V12 is equal to the maximum value of the binary data (i.e., "FFF" in case of using 12 bits).

Similarly, since the second main data value V21 and the second sub data value V22 are reversed (i.e., inverted) from each other, when the second main data value V21 and the second sub data value V22 are normal, a summation of the data values V21 and V22 is equal to the maximum value of the binary data.

Further, since the first main data value V11 and the second main data value V21 are reversed from each other, when the first main data value V11 and the second main data value V21 are normal, a summation of the data values V11 and V21 is equal to the maximum value of the binary data.

Similarly, since the first sub data value V12 and the second sub data value V22 are reversed from each other, when the first sub data value V12 and the second sub data value V22 are normal, a summation of the data values V12 and V22 is equal to the maximum value of the binary data.

Here, a situation in which an abnormality is caused in the first main signal D11, the first sub signal D12, the second main signal D21, or the second sub signal D22 is described based on FIGS. 7A/B and 8A/B. Note that, in an example of FIGS. 4A/B, all of the first main signal D11, the first sub signal D12, the second main signal D21, and the second sub signal D22 are normal, and the data values V11 and V22 are "FFF", and the data values V12 and V21 are "000."

Now, when the first main signal D11, the first sub signal D12, the second main signal D21, and the second sub signal D22 are all normal as shown in FIG. 4A/B, the following combinations of two data values (i.e., (i) the first main data value V11 and the first sub data value V12), (ii) the second main data value V21 and the second sub data value V22, (iii) the first main data value V11 and the second main data value V21, and (iv) the first sub data value V12 and the second sub data value V22, are respectively reversed from each other correctly.

FIGS. 7A/B show a situation in which an abnormality is caused in the first main signal D11, that is, when a normal data value of V11 should be "FFF", the data value V11 is shown as "0FF" in FIG. 7A. In other words, the first main data value V11 and the first sub data value V12 are not correctly reversed from each other in this case.

Similarly, the first main data value V11 and the second main data value V21 are not correctly reversed. Further, based on a comparison between the data values V11, V12, V21, and V22, an abnormal data value is identifiable. That is, which one of the data values V11, V12, V21, and V22 has abnormality can be determined in such manner. Abnormality in a signal other than the first main signal D11 may be handled in the same manner as described above.

FIGS. 8A/B show an example of when the communication lines 112 and 122 are short-circuited.

When the communication lines 112 and 122 are short-circuited, the output signals Sd10 and Sd20 become the same pulse signal. When no abnormality is caused, which is mentioned above, the output signals Sd10 and Sd20 become respectively different pulse signals.

Therefore, when a matching portion (i.e., the same pulse portion) is found in both of the output signals Sd10 and Sd20, such a matching portion indicates that the matching portion should have been reversed (i.e., inverted) in the normal signals, thereby enabling a determination that the communication lines 112 and 122 are short-circuited.

In the present embodiment, a "double-cross" signal reversing scheme is realized, in which the main and sub signals are reversed (i.e., inverted) respectively in the first and second output signals Sd10 and Sd20 (i.e., D12 is reversed from D11, and D22 is reversed from D21), together with the reversing between (i) two preceding main signals D11 and D21 and (ii) between the following sub signals D12 and D22. In such manner, whether (i) one of the data values V11, V12, V21, and V22 has abnormality or (ii) the communication lines 112 and 122 are short-circuited is determinable.

Figure 9:
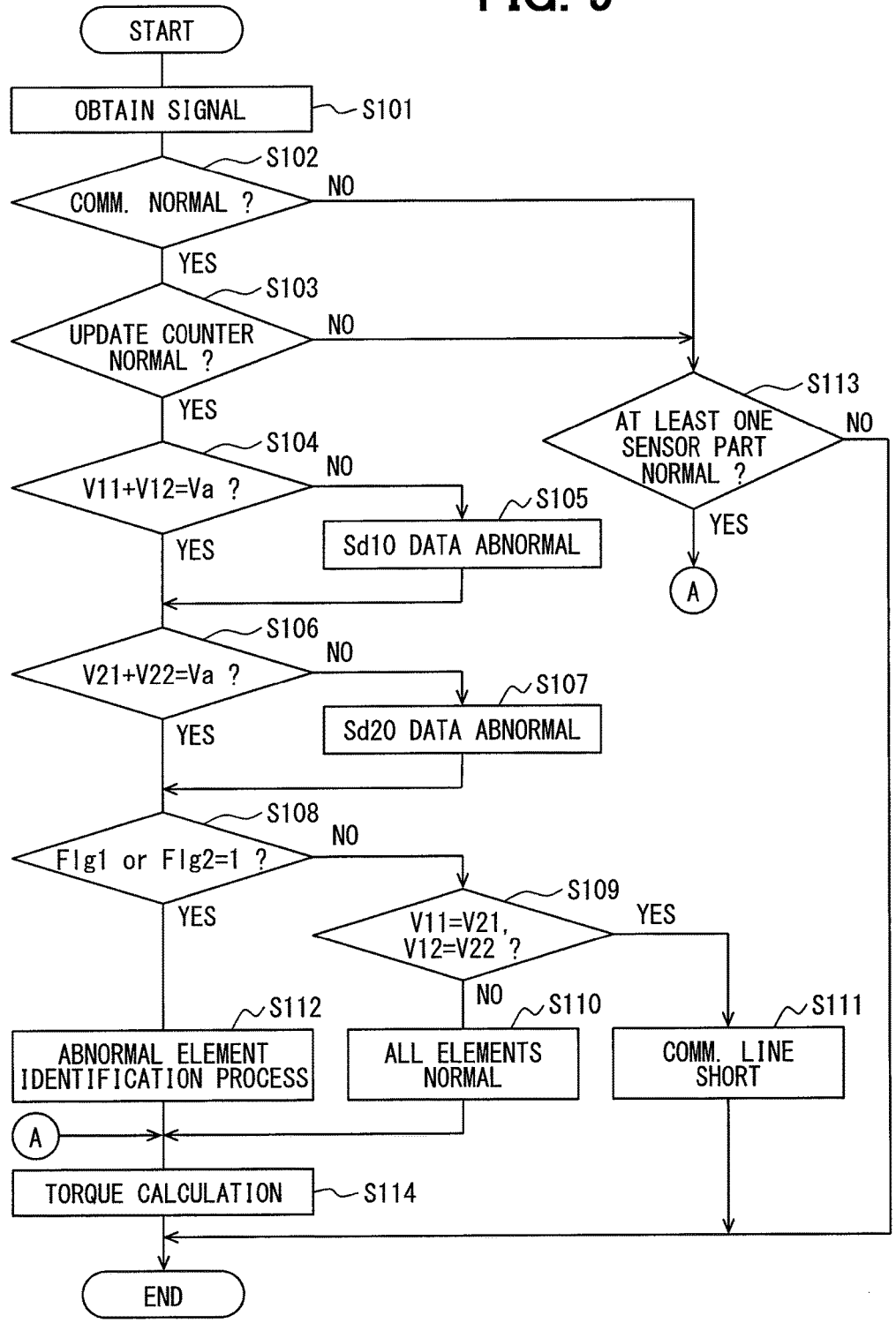
FIG. 9 is a flowchart of an abnormality determination process in the first embodiment of the present disclosure.

The abnormality determination process is described based on a flowchart in FIG. 9.

The abnormality determination process is performed in ECU 85, when the magnetic sensors 50 and 60 and ECU 85 are turned ON.

In the first step S101, (hereafter "step" is abbreviated to "S"), the signal obtainer 851 obtains the output signals Sd10 and Sd20 from the sensor parts 55 and 65.

In S102, the abnormality determiner 855 determines whether the communication to ECU 85 from the sensor parts 55 and 65 is normal, based on the CRC signal.

When the communication to ECU 85 from at least one of the sensor parts 55 and 65 is determined as abnormal (S102:NO), the process proceeds to S113. When the communication to ECU 85 from the sensor parts 55 and 65 is determined as normal (S102:YES), the process proceeds to S103.

In S103, the abnormality determiner 855 determines whether both of the update counters in the output signals Sd10 and Sd20 are normal.

According to the present embodiment, when the update counter is counted up by one from the previous value, it is determined that the data is normal. When the update counter indicates the same value as the previous value, the data is not updated and it is determined as abnormal. When the update counter is counted up by two or more from the previous value, a skip of the data is caused and it is determined that the data is abnormal.

When the update counter in at least one of the output signals Sd10 and Sd20 is determined as abnormal (S103: NO), the process proceeds to S113. When it is determined that both of the update counters in the output signals Sd10 and Sd20 are normal (S103:YES), the process proceeds to S104.

In S104, it is determined by the abnormality determiner 855 whether an addition value V51, which is the summation of the first main data value V11 and the first sub data value V12, matches a theoretical addition value Va.

In the present embodiment, the theoretical addition value Va is "FFF," which is the maximum value of the binary data. When the addition value V51 takes a value in a preset range containing the theoretical addition value Va, it is considered that "the addition value is matching the theoretical addition value Va." The same applies to a matching determination in the following regarding the matching between the other addition values, and the theoretical addition value Va.

When the addition value V51 is determined to be matching the theoretical addition value Va (S104:YES), a temporary determination is performed in which the data values V11 and V12 in the output signal Sd10 are determined as normal, and the process proceeds to S106.

When the addition value V51 is determined as not matching the theoretical addition value Va (S104:NO), the process proceeds to S105.

In S105, the abnormality determiner 855 determines that one of the data values V11 and V12 in the output signal Sd10 is abnormal, and sets a first sensor abnormality flag Flg1, and the process proceeds to S106.

In the drawings, a set state of the first sensor abnormality flag Flg1 is designated as "1", and a non-set state of the flag Flg 1 is designated as "0." The same applies to the other flags mentioned later.

In S106, the abnormality determiner 855 determines whether an addition value V52, which is a sum of the second main data value V21 and the second sub data value V22, matches the theoretical addition value Va.

When the addition value V52 is determined as matching the theoretical addition value Va (S105:YES), a temporary determination is performed in which the data values V21 and V22 in the output signal Sd20 are determined as normal, and the process proceeds to S108.

When the addition value V52 is determined as not matching the theoretical addition value Va (S106:NO), the process proceeds to S107.

In S107, the abnormality determiner 855 determines that one of the data values V21 and V22 in the output signal Sd20 is abnormal, and sets a second sensor abnormality flag Flg2, and the process proceeds to S108.

In S108, the abnormality determiner 855 determines whether at least one of the abnormality flags Flg1 and Flg2 is set. When it is determined that at least one of the abnormality flags Flg1 and Flg2 is set (S108:YES), the process proceeds to S112. When it is determined that neither of the abnormality flags Flg1 nor Flg2 is set (S108:NO), the process proceeds to S109.

In S109, the abnormality determiner 855 determines (i) whether the first main data value V11 and the second main data value V21 match with each other and (ii) whether the first sub data value V12 and the second sub data value V22 match with each other.

Here, when a difference value V55 which is an absolute value of the difference between the first main data value V11 and the second main data value V21 is equal to or less than a determination threshold value, it is interpreted as "the difference value V55 is zero", and it is considered that "the first main data value V11 and the second main data value V21 are matching with each other."

Similarly, when a difference value V56 which is an absolute value of the difference between the first sub data value V12 and the second sub data value V22 is equal to or less than a determination threshold value, it is interpreted as "the difference value V56 is zero", and it is considered that "the first sub data value V12 and the second sub data value V22 are matching with each other."

When it is determined that the first main data value V11 and the second main data value V21 are matching with each other, and the first sub data value V12 and the second sub data value V22 are matching with each other (S109:YES), the process proceeds to S111.

When it is determined that (i) the first main data value V11 and the second main data value V21 are not matching, or (ii) the first sub data value V12 and the second sub data value V22 are not matching (S109:NO), the process proceeds to S110.

Note that this step S109 is a step that is reached when the first main data value V11 and the first sub data value V12 are (determined in S104 as) correctly reversed (i.e., inverted) from each other, and the second main data value V21 and the second sub data value V22 are (determined in S106 as) correctly reversed.

Therefore, when the main data values V11 and V21 are matching with each other, the sub data values V12 and V22 are naturally/inevitably matching with each other, and when the main data value V11 is different from the main data value V21, the sub data value V12 is naturally/inevitably different from the sub data value V22.

In S110, it is determined that all of the sensor elements 551, 552, 651, and 652 are normal, and the process proceeds to S114.

In S111, it is determined that the communication lines 112 and 122 are short-circuited, thereby skipping the calculation of the steering torque in S114.

In S112, which is reached when at least one of the abnormality flags Flg1 and Flg2 is set (S108:NO), the abnormality determiner 855 performs an abnormal element identification process.

Figures 10A, 10B:
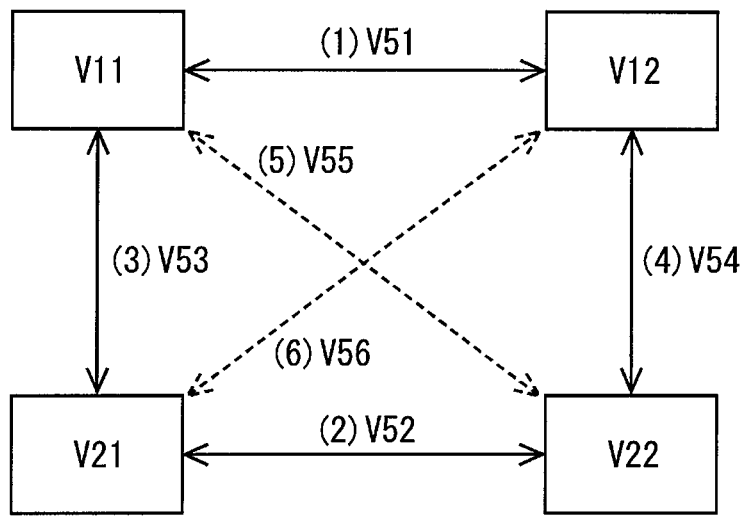
FIG. 10A is a diagram of combinations of data values to be compared when an abnormal element is identified in the first embodiment of the present disclosure.
FIG. 10B is another diagram of combinations of data values to be compared when an abnormal element is identified in the first embodiment of the present disclosure.

The details of the abnormal element identification process are shown in FIGS. 10A/B.

In the abnormal element identification process, when a summation of the reversed two data values is matching the theoretical addition value Va, a normal determination is performed, and when the summation is not matching the value Va, an abnormality determination is performed.

Further, when the two data values which are not reversed are matching with each other, a normal determination is performed, and when the not-reversed data values are not matching, an abnormality determination is performed.

In FIG. 10B, among the boxes of the matrix, one representing a match between (i) the sum of two reversed data values and (ii) the theoretical addition value Va is designated as "OK", and one representing a non-match between the sum of the two reverse data values and the theoretical addition value Va is designated as "NG", and one representing a matching of the two non-reversed data values with each other is designated as "OK", and one representing a non-matching of the two non-reversed data values is designated as "NG".

Then, an abnormal sensor element is identified by the majority decision. Here, "the abnormality of the sensor element" does not just indicate an abnormality of the element itself, but also indicates an abnormality of the data signal caused by other faults/abnormality other than the sensor element.

More practically, the additional values V51-V54 are calculated by equations (1)-(4), and the difference values V55 and V56 are calculated by equations (5) and (6) (see FIG. 10A).

In FIG. 10A, a solid line arrow shows a combination of the two reversed data values, and a dashed line arrow shows a combination of the two non-reversed data values.

$$V51 = V11 + V12 \quad \text{Equation (1)}$$

$$V52 = V21 + V22 \quad \text{Equation (2)}$$

$$V53 = V11 + V21 \quad \text{Equation (3)}$$

$$V54 = V12 + V22 \quad \text{Equation (4)}$$

$$V55 = |V11 - V22| \quad \text{Equation (5)}$$

$$V56 = |V12 - V21| \quad \text{Equation (6)}$$

In FIG. 10B, a situation in which the first main sensor element 551 is abnormal is illustrated.

When the first main sensor element 551 is abnormal, the addition values V51 and V53 using the first main data value V11, which is the data value of the first main sensor element 551, are not matching the theoretical addition value Va, and the difference value V55 becomes greater than the determination threshold value. Further, the additional values V52 and V54 are matching the theoretical addition value Va, and the difference value V56 becomes equal to or less than the determination threshold value.

Therefore, based on the majority decision, it is determinable that an abnormality is caused in the first main sensor element 551. Such an abnormality determination is also performable for the other three sensor elements 552, 651, and 652.

Here, in the present embodiment, the calculation of the four addition values V51-V54 and the two difference values V55 and V56 is described as an example. However, a majority decision based on a choice of the at least three values V51-V56 may also be performed. The values for the majority decision may arbitrarily be chosen based on the determination result of S104, or the like.

After an abnormal sensor element is identified, the process proceeds to S114. When an abnormal sensor element is not identified by multiple failures etc., the calculation of the steering torque in S114 is not performed.

In S113, which is reached (i) when the communication to ECU 85 from at least one of the sensor parts 55 and 65 is determined as abnormal (S102:NO), or, (ii) when the update counter in at least one of the two output signals Sd10 and Sd20 is determined as abnormal (S103:NO), it is determined whether any normal sensor part exists. That is, whether at least one sensor part is normal is determined.

When, in the output signal Sd10, (i) the CRC signal and the update counter are normal, and (ii) the addition value V51 is matching the theoretical addition value Va, it is determined that the first sensor part 55 is normal.

When, in the output signal Sd20, (i) the CRC signal and the update counter are normal, and (ii) the addition value V52 is matching the theoretical addition value Va, it is determined that the second sensor part 65 is normal.

When it is determined that a normal sensor part exists (S113:YES), the process proceeds to S114. When it is determined that no normal sensor part exists (S113:NO), the calculation of the steering torque in S114 is not performed.

In S114, the calculator 858 performs the calculation of the steering torque by using at least one normal data values among the data values V11, V12, V21, and V22.

As described in detail above, the sensor device 1 of the present embodiment is provided with the first sensor part 55, the second sensor part 65, and ECU 85.

The first sensor part 55 has the first main sensor element 551, the first sub sensor element 552, and the first output circuit 555.

The first main sensor element 551 and the first sub sensor element 552 detect the physical quantity (i.e., in the present embodiment, the magnetic flux density at a position between the magnetic flux collecting parts 215 and 225) regarding the magnetic flux collection module 20, which is a detection object.

The first output circuit 555 generates the first output signal Sd10 that includes (i) the first main signal D11 based on the detection value of the first main sensor element 551 and (ii) the first sub signal D12 based on the detection value of the first sub sensor element 552 in such ordered sequence of signals, and transmits the first output signal Sd10.

The second sensor part 65 has the second main sensor element 651, the second sub sensor element 652, and second output circuit 655.

The second main sensor element 651 and the second sub sensor element 652 detect the physical quantity regarding the magnetic flux collection module 20 which is the detection object.

The second output circuit 655 generates the second output signal Sd20 that includes (i) the second main signal D21 based on the detection value of the second main sensor element 651 and (ii) the second sub signal D22 based on the detection value of the second sub sensor element 652 in this order, and transmits the second output signal Sd20.

ECU 85 includes the signal obtainer 851 and the abnormality determiner 855. The signal obtainer 851 obtains the first output signal Sd10 and the second output signal Sd20. The abnormality determiner 855 performs the abnormality determination based on the first output signal Sd10 and the second output signal Sd20.

Either a set of the first main signal D11 and the second sub signal D22, or a set of the first sub signal D12 and the second main signal D21 are the positive (i.e., direct) signals that increase with the increase of the detection value, and the other one of the two sets are the reverse (i.e., inverse) signals that decrease with the increase of the detection value.

In the present embodiment, the first main signal D11 and the second sub signal D22 are the positive signal, and the first sub signal D12 and the second main signal D21 are the reverse signals.

According to the present embodiment, the first main signal D11 and the first sub signal D12 are included in the first output signal Sd10, and the second main signal D21 and the second sub signal D22 are included in the second output signal Sd20.

Therefore, ECU 85 is enabled to use signals respectively corresponding to each of the detection values from the four sensor elements 551, 552, 651, and 652. Thus, an abnormality in the sensor device is appropriately determinable by using the four signals D11, D12, D21, and D22.

Further, since the first main signal D11 and the second sub signal D22 are reversed (i.e., inverted) from each other, and the first sub signal D12 and the second main signal D21 are reversed from each other, even when the detection values are the same, the first output signal Sd10 and the second output signal Sd20 are not generated as the same signal. Therefore, it is determinable whether the signals are transmitted, based on the same detection values, and it is determinable whether the communication lines are short-circuited.

The sensor device 1 includes the first communication line 112 and the second communication line 122. The first communication line 112 connects the first sensor part 55 and ECU 85, and is used for transmission of the first output signal Sd10. The second communication line 122 connects the second sensor part 65 and ECU 85, and is used for transmission of the second output signal Sd20.

The abnormality determiner 855 detects a short circuit between the first communication line 112 and the second communication line 122 by the comparison between the first main signal D11 and the second main signal D21, and by the comparison between the first sub signal D12 and the second sub signal D22.

Here, comparing the data value V11 represented by the first main signal D11 with the data value V21 represented by the second main signal D21 means a "comparison between the first main signal and the second main signal." The same applies to the comparisons of other signals.

Thereby, the short circuit of the first communication line 112 and the second communication line 122 is appropriately detectable.

The abnormality determiner 855 determines the data abnormality of the first output signal Sd10 by the comparison between the first main signal D11 and the first sub signal D12. Further, the abnormality determiner 855 determines the data abnormality of the second output signal Sd20 by the comparison between the second main signal D21 and the second sub signal D22.

According to the present embodiment, since the first main signal D11 and the first sub signal D12 are reversed from each other, the data abnormality of the first output signal Sd10 is appropriately detectable by the comparison between the addition value V51 and the theoretical addition value Va.

Similarly, since the second main signal D21 and the second sub signal D22 are reversed from each other, the data abnormality of the second output signal Sd20 is appropriately detectable by the comparison between the addition value V51 and the theoretical addition value Va.

The abnormality determiner 855 identifies a sensor element having abnormality caused therein by the comparison of at least three of the first main signal D11, the first sub signal D12, the second main signal D21, and the second sub signal D22.

Since ECU 85 obtains the signal D11, D12, D21, and D22 in the present embodiment, which are the four data signals based on each of the detection values of the four sensor elements 551, 552, 651, and 652, an element having abnormality is identifiable appropriately by the majority decision from the comparison among three or more signals.

When comparing (i) the first main signal D11 with (ii) the second sub signal D22, the abnormality determiner 855 performs the abnormality determination based on the difference value V55 (i.e., based on a difference of the data values V11 and V22) that corresponds to the signals D11 and D22.

When comparing (i) the first sub signal D12 with (ii) the second main signal D21, the abnormality determiner 855 performs the abnormality determination based on the difference value V56 (i.e., based on a difference of the data values V12 and V21) that corresponds to the signals D12 and D21.

Further, when comparing (i) the first main signal D11 with (ii) the first sub signal D12 or the second main signal D21, the abnormality determiner 855 performs the abnormality determination based on the data value V11 and the addition value V51 or V53 (i.e., based on (i) the data value V11 and (ii) the summation of the data value V11 and the data value V12, or the summation of the data value V11 and the data value V21) respectively corresponding to the signals D11, D12, D21.

When comparing (i) the first sub signal D12 with (ii) the second sub signal D22, the abnormality determiner 855 performs the abnormality determination based on the data value V12 and the addition value V54 (i.e., based on (i) the data value V12 and (ii) the summation of the data values V12 and V22) that correspond to the signals D12 and D22.

Therefore, the four signals D11, D12, D21, and D22 are appropriately compared.

The CRC signal, which is a communication error detection signal is included in the first output signal Sd10 and in the second output signal Sd20. Therefore, the communication error is appropriately detectable.

The information concerning the update counter indicating that the data is updated is included in the first output signal Sd10 and in the second output signal Sd20. Therefore, it is appropriately determinable whether (i) the detection value is not changed or (ii) the data adherence is being caused.

The first main signal D11, the first sub signal D12, the second main signal D21, and the second sub signal D22 are represented by the nibble. Therefore, each of the signals D11, D12, D21, and D22 is transmitted to ECU 85 by the SENT communication method.

The first main sensor element 551, the first sub sensor element 552, the second main sensor element 651, and the second sub sensor element 652 are the magnetic flux detection elements that detect a change of the magnetic flux of the detection object.

The first main sensor element 551, the first sub sensor element 552, the second main sensor element 651, and the second sub sensor element 652 detect a change of the magnetic flux which changes according to the torque.

More practically, the sensor elements 551, 552, 651, and 652 detect a change of the magnetic flux according to the amount of twist displacement of the torsion bar 13 in the steering system 90, and the sensor device 1 is used for the torque sensor 10.

Therefore, a steering torque is appropriately detectable.

Further, even when an abnormality is caused in a part of the sensor elements 551, 552, 651, and 652, ECU 85 can continue the calculation of the steering torque with a normal accuracy, while continuing the monitoring of abnormality.

The electric power steering apparatus 80 is provided with the sensor device 1, the motor 81, and the speed reduction gear 82. The motor 81 outputs the assist torque for assisting the steering operation of the steering wheel 91 by the driver. The speed reduction gear 82 transmits the torque of the motor 81 to the steering shaft 92, which is the drive object. ECU 85 controls the drive of the motor 81 based on the steering torque calculated based on at least one of the first main signal D11, the first sub signal D12, the second main signal D21, and the second sub signals D21.

Since the electric power steering apparatus 80 of the present embodiment can continue the assistance of the steering operation of the steering wheel 91 by the driver according to the steering torque even in case that an abnormality is caused in some of the sensor elements 551, 552, 651, and 652, it contributes to an improvement of the vehicle safety.

As for ECU 85, when continuing the assistance of the steering operation after the abnormality is caused in some of the sensor elements 551, 552, 651, and 652, it is desirable for ECU 85 to let the driver know that an abnormality is being caused by lighting a warning lamp, by sound/voice or the like.

Second Embodiment

Figure 11:
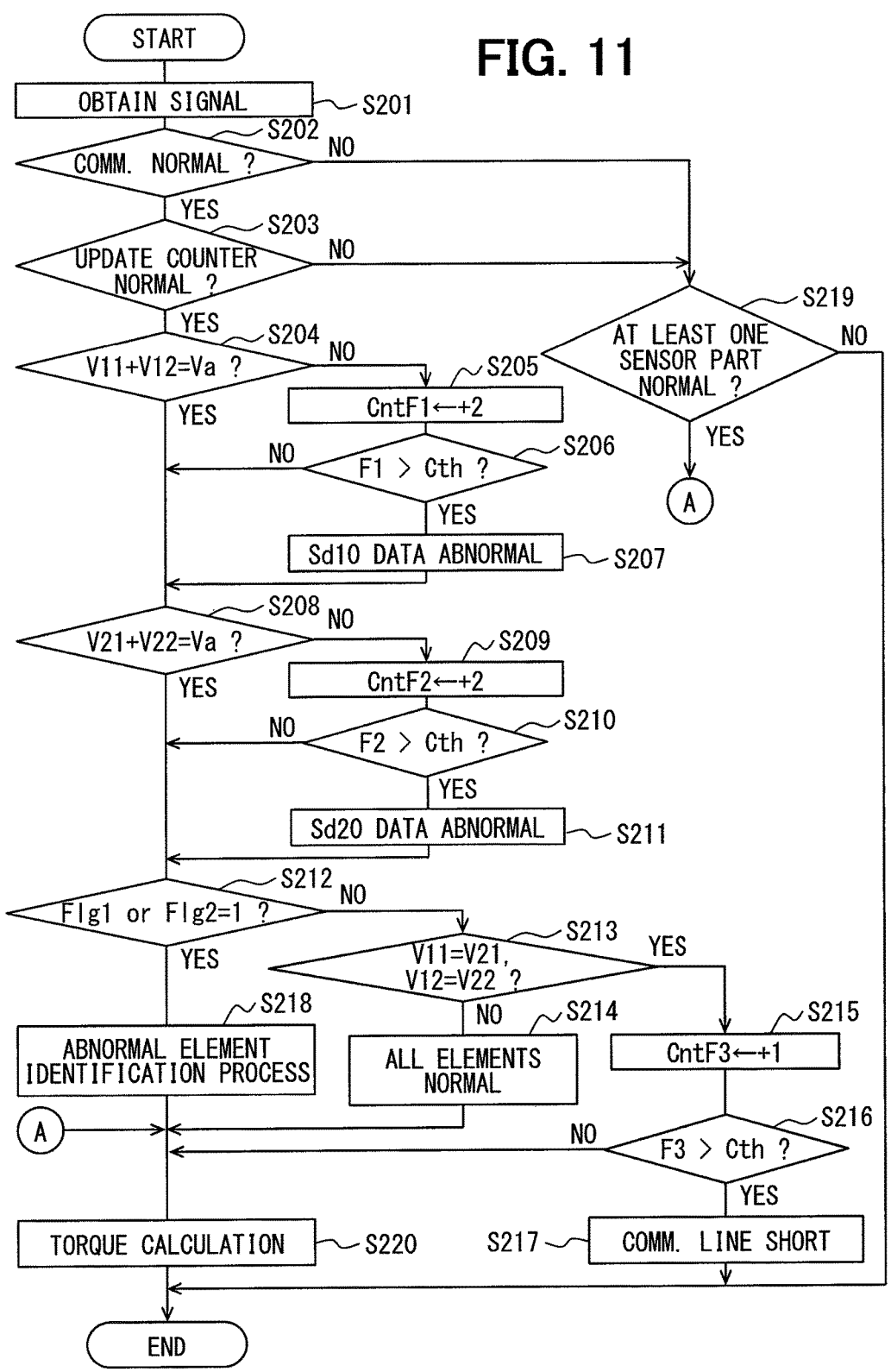
FIG. 11 is a flowchart of the abnormality determination process in a second embodiment of the present disclosure.

The second embodiment of the present disclosure is described based on FIG. 11.

In the present embodiment, the abnormality determination process is different from the one in the above-mentioned embodiment, and since the configuration of the sensor device 1, the output signals Sd10 and Sd20 and the like are the same as that of the above-mentioned embodiment, the following description focuses on the abnormality determination process.

As described in the above-mentioned embodiment, ECU 85 performs various calculations using the four data values V11, V12, V21, and V22 obtained from the two sensor parts 55 and 65. Here, as shown in FIG. 3, since the sensor parts 55 and 65 are connected with ECU 85 via the different power source lines 111 and 121 and the different ground lines 113 and 123, the data values may vary due to an error of the supplied voltage and the like which may be observed as individual sensor variation. Thus, theoretically same addition values V51 (=V11+V12) and V53 (=V11+V21), which should both be the addition value Va, may actually be different (i.e., the addition value V53 that is derived from an addition of the data values V11 and V21 tends to have a greater error than the addition value V51 that is derived from an addition of the data values V11 and V12), due to such an individual sensor variation. The same applies to the other addition values and difference values (i.e., an error tends to be greater in a calculation value calculated by using the data values derived from two (i.e., different) sensor parts than in a calculation value calculated by using the data value derived from a single sensor part).

Therefore, in the present embodiment, for preventing an erroneous determination by the error resulting from the individual sensor variation, respectively different weights are used (i) in the abnormality determination by the calculation value using the data values from the single sensor part, and (ii) in the abnormality determination by the calculation value using the data values from the two or more different sensor parts. More specifically, the count-up value of the counter concerning the abnormal determination is configured to be different values.

The abnormality determination process in the present embodiment is described based on a flowchart in FIG. 11. The abnormality determination process is performed in ECU 85, just like the first embodiment, when the magnetic sensors 50 and 60 and ECU 85 are turned ON.

The process in each of S201-S203 is the same as the process in each of S101-S103 in FIG. 9, and, when a negative determination is performed in S202 and S203, the process proceeds to S219.

The process of S204 is the same as the process of S104 (i.e., determining whether the addition value V51 (i.e., the sum of the first main data value V11 and the first sub data value V12) matches the theoretical addition value Va. The determination process in this case is a comparison between the data value V11 and the data value V12 in the first sensor part 55 (i.e., in the single sensor part).

When the addition value V51 is determined as matching the theoretical addition value Va (S204:YES), a temporary determination is performed that the data values V11 and V12 in the output signal Sd10 are normal, and the process proceeds to S208. At such timing, a counted value F1 of the first abnormality counter is reset.

When the addition value V51 is determined as not matching the theoretical addition value Va (S204:NO), the process proceeds to S205.

In S205, the counted value F1 of the first abnormality counter is incremented by +2.

In S206, it is determined whether the counted value F1 is greater than a count determination threshold value Cth.

When the counted value F1 is determined to be equal to or less than the count determination threshold value Cth (S206:NO), the abnormality determination is not performed, and the process proceeds to S208.

When the counted value F1 is determined to be greater than the count determination threshold value Cth (S206: YES), the process proceeds to S207.

In S207, just like S105, one of the data values V11 and V12 in the output signal Sd10 is determined as abnormal, and the first sensor abnormality flag Flg1 is set, and the process proceeds to S208.

The process of S208 is the same as the process of S106 (i.e., determining whether the addition value V52 (i.e., the summation of the second main data value V21 and the second sub data value V22) matches the theoretical addition value Va). The determination process in this case is a comparison between the data values V21 and V22 in the second sensor part 65 (i.e., in the single sensor part).

When the addition value V52 is determined as matching the theoretical addition value Va (S208:YES), a temporary determination is performed that the data values V21 and V22 in the output signal Sd20 are normal, and the process proceeds to S212. At such timing, a counted value F2 of the second abnormality counter is reset.

When the addition value V52 is determined as not matching the theoretical addition value Va (S208:NO), the process proceeds to S209.

In S209, the counted value F2 the second abnormality counter is incremented by +2. Here, the count-up value of the second abnormality counter is the same as the count-up value of the first abnormality counter.

In S210, it is determined whether the counted value F2 is greater than the count determination threshold value Cth.

When the counted value F2 is determined to be equal to or less than the count determination threshold value Cth (S210:NO), the abnormality determination is not performed, and the process proceeds to S212.

When it is determined that the counted value F2 is greater than the count determination threshold value Cth (S210: YES), the process proceeds to S211.

In S211, just like S107, one of the data values V21 and V22 in the output signal Sd20 is determined as abnormal, and the second abnormality flag Flg2 is set, and the process proceeds to S212.

The process in each of S212-S214 is the same as the process in each of S108-S110. In S213, when it is determined that (i) the first main data value V11 and the second main data value V21 are not matching with each other or (ii) the first sub data value V12 and the second sub data value V22 are not matching with each other (S213:NO), the process proceeds to S214 and determines that all of the sensor elements 551, 552, 651, and 652 are normal.

When, in S213, it is determined that (i) the first main data value V11 and the second main data value V21 are matching with each other and (ii) the first sub data value V12 and the second sub data value V22 are matching with each other (S213:YES), the process proceeds to S215.

In S215, a counted value F3 of the short circuit abnormality counter is incremented by +1.

Here, in S213 concerning the short circuit determination of the communication lines 112 and 122, a comparison of the data values from the different sensor parts 55 and 65 is performed.

Therefore, the count-up value of the short circuit abnormality counter in this step is configured to be a value smaller than the count-up value of the first abnormality counter and the second abnormality counter concerning the abnormality determination respectively in the sensor parts 55 and 65 (i.e., in the single sensor part 55, and in the single sensor part 65).

In S216, it is determined whether the counted value F3 is greater than the count determination threshold value Cth. In this case, the count determination threshold value Cth is the same value as that in S206 and S210.

When the counted value F3 is determined to be equal to or less than the count determination threshold value Cth (S216:NO), the abnormality determination is not performed, and the process proceeds to S220.

When it is determined that the counted value F3 is greater than the count determination threshold value Cth (S216: YES), the process proceeds to S217, and it is determined that the communication lines 112 and 122 are short-circuited.

The process in each of S217-S220 is the same as the process in each of S111-S114.

By taking it into consideration that an error becomes greater in the comparison of the data values from the different sensor parts than the comparison of the data values from the single sensor part in the present embodiment, the count-up value of the short circuit abnormality counter concerning the short circuit determination of the communication lines 112 and 122 is configured to be a smaller value than the count-up value of the first abnormality counter and of the second abnormality counter concerning the data abnormality determination in the sensor part.

Thereby, in the short circuit abnormality of the communication lines 112 and 122, the erroneous determinations resulting from the detection error among the different sensor parts are reduced.

In the present embodiment, using a smaller count-up value for the counter concerning the abnormality determination means using a heavier weight assigned to such determination.

In the present embodiment, when the abnormality determiner 855 compares the first main signal D11 with the first sub signal D12, or when the abnormality determiner 855 compares the second main signal D21 with the second sub signal D22, a weight for such comparisons is configured to be heavier than a weight for a comparison between (i) the first main signal D11 or the first sub signal D12 and (ii) the second main signal D21 or the second sub signal D22.

When using two different sensor parts 55 and 65, a probability of having a greater error in the detection value increases, due to the error of the supplied voltage and the like.

In the present embodiment, the abnormality determination is more appropriately performed by using a heavier weight for the comparison of the signals from the single sensor part than for the comparison of the signals from the different sensor parts.

The same effects as the above-mentioned embodiment are also achieved.

OTHER EMBODIMENTS (a) Output Signal

In the above-mentioned embodiments, the first main signal and the second sub signal are positive signals (e.g., a non-inverted signal) which increase with an increase of the detection value, and the first sub signal and the second main signal are inverted signals which decrease with an increase of the detection value.

In other embodiments, the first main signal and the second sub signal may be inverted signals which decrease with an increase of the detection value, and the first sub signal and the second main signal may be positive signals which increase with an increase of the detection value.

The communication error detection signal in the above-mentioned embodiments is the CRC signal.

In other embodiments, as long as the signal is usable for detecting the communication error in the controller, a signal other than the CRC signal may be used. Further, the output signal does not need to include the communication error detection signal.

In the above-mentioned embodiments, the output signal includes the information on the update counter.

In other embodiments, the output signal does not need to include the information on the update counter.

In the above-mentioned embodiments, the first main signal, the first sub signal, the second main signal, and the second sub signal are represented by the nibble.

In other embodiments, the first main signal, the first sub signal, the second main signal, and the second sub signal may be represented in forms other than the nibble.

In the above-mentioned embodiments, the output signal is transmitted to the controller by the SENT communication method.

In other embodiments, as long as the communication method is capable of including the main signal and the sub signal in the output signal, any communication method other than the SENT communication method may be used.

In the above-mentioned embodiments, the first output signal and the second output signal are transmitted to the controller with the predetermined cycle.

In other embodiments, the first output signal and the second output signal may be transmitted to the controller in synchronization with a trigger signal that is transmitted, for example, from the controller. Further, a timing signal for controlling a transmission timing of the output signals Sd10 and Sd20 may be transmitted from one of the magnetic sensors 50 and 60 to the other.

The transmission timings of the first output signal and the second output signal may be the same timing, or may be different timings.

For example, the transmission timing of the first output signal may be shifted by half signal cycle from the transmission timing of the second output signal, thereby enabling the controller to receive the output signal at every half signal cycle, which improves the communication speed in appearance.

(b) Sensor Part

In the above-mentioned embodiments, the two sensor parts are sealed in respectively different packages.

In other embodiments, the two sensor parts may be sealed in one package by one sealed part.

In the above-mentioned embodiments, the two magnetic sensors are mounted on the same surface of one substrate at side-by-side positions.

In other embodiments, the two magnetic sensors may be mounted on both surfaces of one substrate, or mounted in any arrangement on one substrate. Further, the two magnetic sensors may be not necessarily mounted on one substrate.

In the above-mentioned embodiments, the sensor element is the Hall element.

In other embodiments, the sensor elements may be the magnetism detecting elements other than the Hall element, or may be the elements which detect a change of physical quantity other than magnetism.

In the above-mentioned embodiments, the sensor part serves as a torque sensor detecting a steering torque.

In other embodiments, the sensor part may serve as a sensor other than the torque sensor (e.g., a pressure sensor detecting a pressure). That is, the physical quantity calculated in the calculator may be a torque other than the steering torque, and may be a physical quantity other than the torque.

In the above-mentioned embodiments, the detection object is the magnetic flux collection module.

In other embodiments, the detection object may be any matter other than the magnetic flux collection module.

(c) Abnormality Determiner

In the above-mentioned embodiments, when (i) the first main signal and the second main signal are matching with each other and (ii) the first sub signal and the second sub signal are matching with each other, it is determined that the short circuit abnormality of the communication lines is being caused.

In other embodiments, at a normal operation time, it may be determined that the short circuit abnormality of the communication lines is being caused when the summation of the first main signal and the second main signal and the summation of the first sub signal and the second sub signal are respectively matching the theoretical addition value.

In the above-mentioned embodiments, the abnormal element is identified by comparing signals from the single sensor first.

In other embodiments, the abnormal element may be identified by comparing the signals from the different sensors first.

In the above-mentioned embodiments, the weight for comparison between the first main signal and the first sub signal or the weight or comparison between the second main signal and the second sub signal is changed from the weight for comparison between (i) the first main signal or the first sub signal and (ii) the second main signal or the second sub signal, by changing the count-up value.

More practically, the count-up value of the first abnormality counter and the second abnormality counter is set to +2, and, the count-up value of the short circuit abnormality counter is set to +1.

The count-up value of each of those counters may be not only set to +2 and +1, but may also be set to any value (e.g., may be set to the same value).

The weight of the comparisons may be changed by changing the count determination threshold value, while using the same count-up value.

The weight of the comparisons may be changed in other methods other than a method using the counters.

(d) Sensor Device

In the above-mentioned embodiments, the sensor device is applied to the electric power steering apparatus.

In other embodiments, the sensor device may be applied to other in-vehicle devices other than the electric power steering apparatus, and may also be applied to other devices which are not disposed in a vehicle.

Although the present disclosure has been described in connection with preferred embodiment thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A sensor device comprising:
   a first sensor part including:
      a first main sensor element configured to detect a first detection value corresponding to a first physical quantity from a detection object and to generate a first main signal based on the detected first detection value;
      a first sub sensor element configured to detect a second detection value corresponding to a second physical quantity from the detection object and to generate a first sub signal based on the detected second detection value; and
      a first output circuit that generates and transmits a first output signal including an ordered sequence of signals in part from the first main signal to the first sub signal;
   a second sensor part including:
      a second main sensor element configured to detect a third detection value corresponding to a third physical quantity from the detection object and to generate a second main signal based on the detected third detection value;
      a second sub sensor element configured to detect a fourth detection value corresponding to a fourth physical quantity from the detection object and to generate a second sub signal based on the detected fourth detection value; and
      a second output circuit that generates and transmits a second output signal including an ordered sequence of signals in part from the second main signal to the second sub signal;
   a controller including:
      a signal obtainer configured to obtain the first output signal and the second output signal; and
      an abnormality determiner configured to determine an abnormality based on the first output signal and the second output signal;
   a first communication line configured to connect the first sensor part and the controller and to transmit the first output signal; and
   a second communication line configured to connect the second sensor part and the controller and to transmit the second output signal, wherein
   the first main signal and the second sub signal are paired as a first set of signals, the first set of signals configured to increase when the first detection value and the third detection value increase, and to decrease when the first detection value and the third detection value decrease, and wherein
   the second main signal and the first sub signal are paired as a second set of signals, the second set of signals configured to increase when the second detection value and the fourth detection value increase, and to decrease when the second detection value and the fourth detection value decrease, such that the second set of signals increases when the first set of signals decreases, and such that the second set of signals decreases when the first set of signals increases, and wherein
   the first sub signal is inverted relative to the first main signal, the second sub signal is inverted relative to the second main signal, the second main signal is inverted relative to the first main signal, and the second sub signal is inverted relative to the first sub signal, and wherein
   the abnormality detector is further configured to
      detect an abnormality in the first output signal by comparing the first main signal to the first sub signal, and
      detect an abnormality in the second output signal by comparing the second main signal to the second sub signal.

2. The sensor device of claim 1, wherein
the abnormality determiner is further configured to detect a short-circuit between the first communication line and the second communication line based on (i) a comparison between the first main signal and the second main signal and (ii) a comparison between the first sub signal and the second sub signal.

3. The sensor device of claim 1, wherein the abnormality determiner is further configured to identify an abnormal sensor element having an abnormality based on a comparison of at least three signals among the first main signal, the first sub signal, the second main signal and the second sub signal.

4. The sensor device of claim 1, wherein
the abnormality determiner is further configured to determine an abnormality based on a difference between data values corresponding to the first main signal and second sub signal, or
the first sub signal and second main signal,
when the abnormality determiner (i) compares the first main signal with the second sub signal, or (ii) compares the first sub signal with the second main signal, and wherein
the abnormality determiner is further configured to determine an abnormality based on a sum of data values corresponding to
the first main signal with the first sub signal, or
the first sub signal with the second sub signal,
when the abnormality determiner (iii) compares the first main signal with the first sub signal or the second main signal, or (iv) compares the first sub signal with the second sub signal.

5. The sensor device of claim 1, wherein the abnormality determiner uses a heavier weight for (i) a comparison between the first main signal and the first sub signal or (ii) a comparison between the second main signal and the second sub signal than a weight for (iii) a comparison between (a) the first main signal or the first sub signal and (b) the second main signal or the second sub signal.

6. The sensor device of claim 1, wherein the first output signal and the second output signal include a communication error detection signal.

7. The sensor device of claim 1, wherein the first output signal and the second output signal include information regarding an update counter indicative of an update of data.

8. The sensor device of claim 1, wherein each of the first main signal, the first sub signal, the second main signal, and the second sub signal is represented by a nibble.

9. The sensor device of claim 1, wherein the first main sensor element, the first sub sensor element, the second main sensor element, and the second sub sensor element are respectively provided as a magnetic flux detection element that detects a change of a magnetic flux of the detection object.

10. The sensor device of claim 9, wherein the first main sensor element, the first sub sensor element, the second main sensor element, and the second sub sensor element are respectively configured to detect a change of the magnetic flux according to a torque.

11. An electric power steering device comprising:
the sensor device of claim 10;
a motor configured to output an assist torque for assisting a steering operation of a steering member;
a power transmission unit configured to transmit the assist torque of the motor to a drive object, wherein
the controller of the sensor device is configured to control a drive of the motor based on a steering torque that is calculated based on at least one of the first main signal, the first sub signal, the second main signal, and the second sub signal.

12. The sensor device of claim 1, wherein
each of the first main signal, the first sub signal, the second main signal, and the second sub signal, extend between a minimum detection value and a maximum detection value, and wherein
each point on the first main signal corresponds to a first main data value,
each point on the first sub signal corresponds to a first sub data value,
each point on the second main signal corresponds to a second main data value, and
each point of the second sub signal corresponds to a second sub data value, and wherein
for corresponding points on each of the first main signal, the first sub signal, the second main signal, and the second sub signal,
the first main data value is an inverse of the first sub data value and the second main data value,
the first sub data value is an inverse of the first main data value and the second sub data value,
the second main data value is an inverse of the first main data value and the second sub data value, and
the second sub data value is an inverse of the first sub data value and the second main data value, and wherein
for corresponding points on each of the first main signal, the first sub signal, the second main signal, and the second sub signal, when each of the first main sensor element, the first sub sensor element, the second main sensor element, and the second sub sensor element are operating without an abnormality,
the first main data value added to the first sub data value or the second main data value is the maximum detection value;
the first sub data value added to the first main data value or the second sub data value is the maximum detection value;
the second main data value added to the first main data value or the second sub data value is the maximum detection value; and
the second sub data value added to the first sub data value or the second main data value is the maximum detection value.

* * * * *